US009878732B2

(12) United States Patent
Urushibata

(10) Patent No.: US 9,878,732 B2
(45) Date of Patent: Jan. 30, 2018

(54) ROTATIONAL OPERATION DEVICE

(71) Applicant: KABUSHIKI KAISHA TOKAI RIKA DENKI SEISAKUSHO, Aichi (JP)

(72) Inventor: Takanori Urushibata, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 75 days.

(21) Appl. No.: 15/161,730

(22) Filed: May 23, 2016

(65) Prior Publication Data

US 2016/0355207 A1 Dec. 8, 2016

(30) Foreign Application Priority Data

Jun. 5, 2015 (JP) ................................. 2015-114806

(51) Int. Cl.
*B62D 1/16* (2006.01)
*B62D 5/00* (2006.01)
*G05G 5/03* (2008.04)

(52) U.S. Cl.
CPC ............... *B62D 1/16* (2013.01); *B62D 5/005* (2013.01); *G05G 5/03* (2013.01)

(58) Field of Classification Search
CPC ............. B62D 1/16; B62D 5/005; G05G 5/03
See application file for complete search history.

(56) References Cited

U.S. PATENT DOCUMENTS 8,181,550 B2 * 5/2012 Gemmati ................ B64C 13/28
74/470
9,200,676 B2 * 12/2015 Yamaguchi .............. B62D 3/02

2013/0161117 A1 6/2013 Higashi et al.
2017/0080968 A1 * 3/2017 Frenzel ..................... B62D 1/16
2017/0225704 A1 * 8/2017 Urushibata ............ B62D 5/001

FOREIGN PATENT DOCUMENTS

| JP | 2000-53008 | | 2/2000 | |
|---|---|---|---|---|
| JP | 2014-041469 | | 3/2014 | |
| JP | 2014-215804 | | 11/2014 | |
| JP | 2016103098 A | * | 6/2016 | ............... G05G 1/08 |
| JP | 2016103099 A | * | 6/2016 | ............... G05G 5/03 |
| WO | WO 2008/120231 A2 | * | 10/2008 | ............... B62D 1/16 |

OTHER PUBLICATIONS

Search Report issued in EPO Patent Application No. 16172094.1, dated Nov. 3, 2016.

* cited by examiner

*Primary Examiner* — Faye M Fleming
(74) *Attorney, Agent, or Firm* — Greenblum & Bernstein, P.L.C.

(57) ABSTRACT

A rotational operation device includes a holder fixed to a rotation shaft, a torsion coil spring, and a case accommodating the holder and the torsion coil spring. The torsion coil spring includes a coil, fitted to the rotation shaft, and two protrusions, located at opposite ends of the coil. When the rotation shaft is rotated, the case restricts movement of the first protrusion, and the holder pushes the second protrusion in a rotation direction of the rotation shaft. The case includes a first groove that receives the first protrusion. The holder includes a second groove that receives the second protrusion. The first and second protrusions are spaced apart by an invariable interval set by a fixed length between the first and second grooves. The fixed length is set to a distance that produces a gap between coil windings when the coil is in a load-free state.

4 Claims, 4 Drawing Sheets

Load-Free State

Twisted State

US 9,878,732 B2

ROTATIONAL OPERATION DEVICE

CROSS-REFERENCE TO RELATED APPLICATIONS

This application is based upon and claims the benefit of priority from prior Japanese Patent Application No. 2015-114806, filed on Jun. 5, 2015, the entire contents of which are incorporated herein by reference.

FIELD

This disclosure relates to a rotational operation device that uses a torsion coil spring to generate an operational reaction force.

BACKGROUND

Japanese Laid-Open Patent Publication No. 2014-41469 describes a prior art example of a rotational operation device. The rotational operation device described in the publication includes a steering shaft, a holder, a torsion coil spring, and a case. The steering shaft rotates integrally with a steering wheel. The holder is fixed to the steering shaft. The torsion coil spring is fitted onto the steering shaft. The case accommodates the holder and the torsion coil spring. The torsion coil spring includes two protrusions that are located at opposite ends of the coil. The case supports one of the two protrusions in an immovable manner. The holder supports the other one of the two protrusions. Rotation of the steering shaft applies force to the protrusion supported by the holder and twists the torsion coil spring. In this structure, when the steering shaft rotates and twists the torsion coil spring, the twisting force is transmitted as an operational reaction force to the steering wheel. This allows the user to perceive the operational reaction force.

SUMMARY

It is desirable that the operational reaction force be changed in the proximity of the rotational terminal end of the steering wheel.

One aspect of this disclosure is a rotational operation device including a rotation shaft, a holder, a torsion coil spring, and a case. The rotation shaft is rotated when an operation member is rotated. The holder is fixed to the rotation shaft. The torsion coil spring includes a coil and two protrusions. The rotation shaft is inserted through the coil, and the two protrusions are located at opposite ends of the coil. The case accommodates the holder and the torsion coil spring. The holder and the case are configured to twist the coil when the rotation shaft is rotated by restricting movement of one of the protrusions with the case and pushing the other one of the protrusions in a rotation direction of the rotation shaft with the holder. The case includes a first groove that receives the one of the protrusions. The holder includes a second groove that receives the other one of the protrusions. The two protrusions are spaced apart in an axial direction of the rotation shaft by an interval that is invariable and set by a fixed length between the first groove of the case and the second groove of the holder. The fixed length is set to a distance that produces a gap between windings of the coil when the torsion coil spring is in a load-free state, with the two protrusions supported by the first and second grooves.

Other aspects and advantages of the embodiments will become apparent from the following description, taken in conjunction with the accompanying drawings, illustrating by way of example the principles of the invention.

It is to be understood that both the foregoing general description and the following detailed description are exemplary and explanatory and are not restrictive of the invention, as claimed.

BRIEF DESCRIPTION OF THE DRAWINGS

The embodiments, together with objects and advantages thereof, may best be understood by reference to the following description of the presently preferred embodiments together with the accompanying drawings in which.

DESCRIPTION OF THE EMBODIMENTS

One embodiment of a rotational operation device will now be described.

Figure 1:
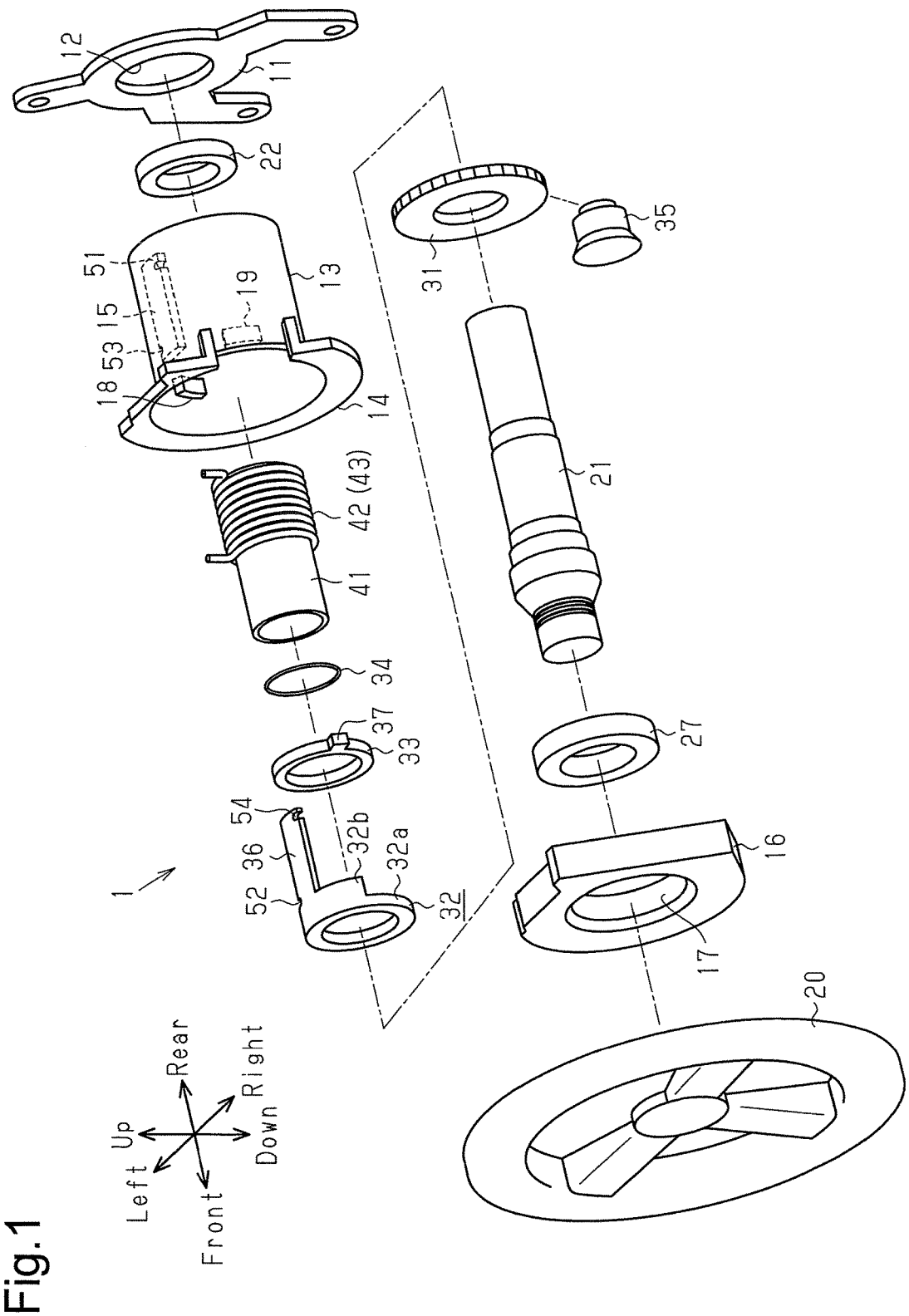
FIG. 1 is an exploded perspective view illustrating one embodiment of a steering device.
Figure 2A:
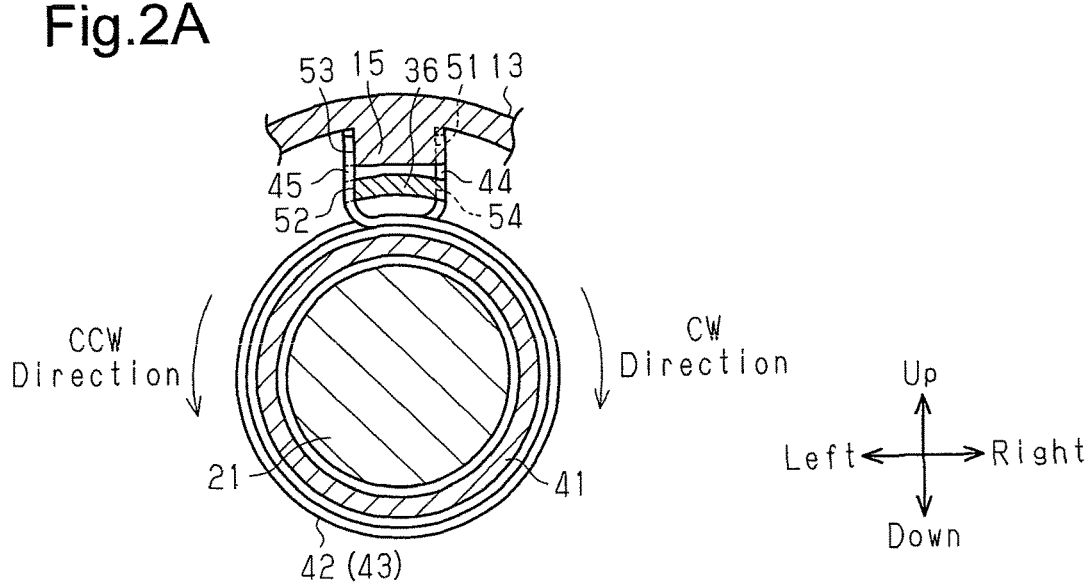
FIG. 2A is a cross-sectional view illustrating the location of a holder piece when the steering shaft is located at a reference position.

FIG. 1 illustrates a steering device 1 that is one example of a rotational operation device. The steering device 1 includes a plate 11 fixed to a vehicle body (not illustrated). The plate 11 includes a plate hole 12. A cylindrical case 13 is fixed to the front surface of the plate 11. The cylindrical case 13 extends in the front-rear direction of the steering device 1. The cylindrical case 13 is coaxial with the plate hole 12. Although not illustrated in detail, the front end of the cylindrical case 13 includes a flange 14 having a diameter that gradually increases toward the front. A spring stopper 15 projects from the inner surface of the cylindrical case 13. The spring stopper 15 extends in the axial direction of the cylindrical case 13. Further, the inner surface of the cylindrical case 13 includes a first rotation restriction projection 18 and a second rotation restriction projection 19. As illustrated in FIG. 2C, when viewing the cylindrical case 13 from the front in the axial direction, the spring stopper 15 is located at the twelve o'clock position, the first rotation restriction projection 18 is located at the ten o'clock position, and the second rotation restriction projection 19 is located at the two o'clock position. In the present example, the first rotation restriction projection 18 is located at a position separated by 100° in the clockwise direction from the six o'clock position, and the second rotation restriction projection 19 is located at a position separated by 100° in the counterclockwise direction from the six o'clock position.

A cover 16 is fixed to the flange 14. The cover 16 includes a cover hole 17 that is coaxial with the cylindrical case 13. A post-shaped steering shaft 21 is inserted through the plate hole 12 of the plate 11, the cylindrical case 13, and the cover hole 17 of the cover 16. The steering shaft 21 is rotationally supported by a plate bearing 22, which is received in the plate hole 12, and a cover bearing 27, which is received in the cover hole 17. A steering wheel 20, which is operable by a user, is coupled to the front end of the steering shaft 21. The steering wheel 20 corresponds to an operation member, and the steering shaft 21 corresponds to a rotation shaft.

A gear 31, a holder 32, a rotation stopper 33, and a retaining ring 34 are fitted onto the steering shaft 21 between the cover bearing 27 and the plate bearing 22. A rotary damper 35, which is rotationally supported by the flange 14 of the cylindrical case 13, is engaged with the gear 31. The rotary damper 35 reduces the rotation speed of the gear 31 and the steering shaft 21. The holder 32 includes a cylindrical holder body 32a and a semi-cylindrical step 32b, which is continuous with the rear surface of the holder body 32a. The holder body 32a is fitted onto the steering shaft 21. Accordingly, the holder 32 rotates integrally with the steering shaft 21. A holder piece 36 extends from the rear side of the semi-cylindrical step 32 in the axial direction of the cylindrical case 13. As illustrated in FIG. 2A, the holder piece 36 is located between the spring stopper 15 and the steering shaft 21 in the vertical direction of the steering device 1 (radial direction of steering shaft 21). The holder piece 36 has a dimension in the lateral direction (direction of tangent on outer circumferential surface of steering shaft 21) that is set to be the same as the dimension of the spring stopper 15 in the lateral direction. The steering shaft 21 includes a reference position set in alignment with the laterally central part of the holder piece 36 and the laterally central part of the spring stopper 15.

Referring to FIGS. 1 and 2C, the rotation stopper 33 is generally cylindrical and rotatable relative to the steering shaft 21. As illustrated in FIG. 2C, a restriction projection 37 projects in the radial direction from the outer circumferential surface of the rotation stopper 33. The rotation stopper 33 is arranged so that the first and second rotation restriction projections 18 and 19 are located in the rotation path of the restriction projection 37. Further, the restriction projection 37 is located in the rotation path of the semi-cylindrical step 32b. Referring to FIG. 2C, as viewed from the front of the steering shaft 21, the restriction projection 37 is located at a position separated from the first rotation restriction projection 18 in the counterclockwise direction and separated from the second rotation restriction projection 19 in the clockwise direction. When the steering shaft 21 is rotated, the holder 32 rotates and the semi-cylindrical step 32b contacts the restriction projection 37. When the steering shaft 21 is further rotated, the semi-cylindrical step 32b of the holder 32 pushes the restriction projection 37 and rotates the rotation stopper 33. Thus, the steering shaft 21 can be rotated to a position where the restriction projection 37, which is pushed by the holder 32, contacts the first rotation restriction projection 18 or the second rotation restriction projection 19. The gear 31, the holder 32, and the rotation stopper 33 are in contact with one another in this order in the axial direction. The retaining ring 34 restricts axial displacement of the gear 31, the holder 32, and the rotation stopper 33 relative to the steering shaft 21.

A cylindrical spacer 41 is fitted onto the steering shaft 21 between the retaining ring 34 and the plate bearing 22. A torsion spring 42 is fitted onto the spacer 41. The torsion spring 42 is formed from a coil of a metal wire wound into a spiral form. The torsion spring 42 corresponds to a torsion coil spring. The spacer 41 is located between the steering shaft 21 and the torsion spring 42 and prevents contact of the steering shaft 21 with the torsion spring 42.

Figure 3:
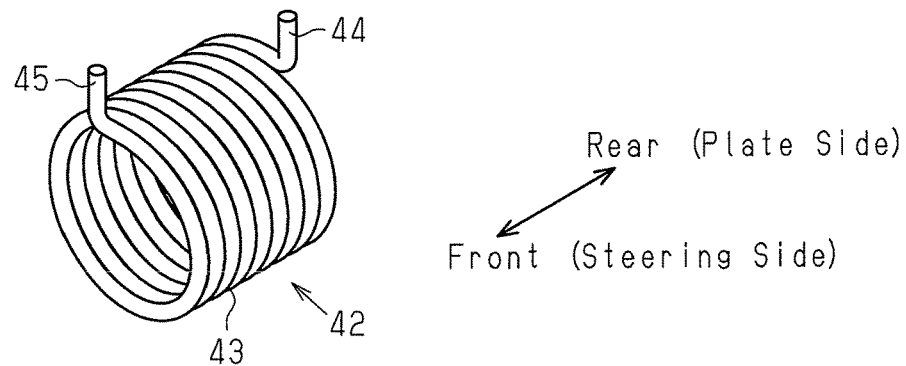
FIG. 3 is a perspective view of a torsion spring.

As illustrated in FIG. 3, the torsion spring 42 includes a coil 43 and first and second protrusions 44 and 45, which are located at the two opposite ends of the coil 43. When the torsion spring 42 is coupled to the spacer 41, the first protrusion 44 is located at the side closer to the plate 11, and the second protrusion 45 is located at the side closer to the steering wheel 20. The first and second protrusions 44 and 45 are upwardly bent parallel to each other. Referring to FIG. 2A, as viewed from the front of the steering shaft 21, the first protrusion 44 is located at the clockwise side of the holder piece 36 and the spring stopper 15. Further, the first protrusion 44 contacts the right surfaces of the holder piece 36 and the spring stopper 15. The second protrusion 45 is located at the counterclockwise side of the holder piece 36 and the spring stopper 15. Further, the second protrusion 45 is in contact with the left surfaces of the holder piece 36 and the spring stopper 15.

The right surface of the spring stopper 15 includes a first groove 51, and the left surface of the holder piece 36 includes a second groove 52. The left surface of the spring stopper 15 includes a third groove 53, and the right surface of the holder piece 36 includes a fourth groove 54. In the present example, the first groove 51 in the right surface of the spring stopper 15 and the fourth groove 54 in the right surface of the holder piece 36 define a first cooperative groove that supports the first protrusion 44. Further, the third groove 53 in the left surface of the spring stopper 15 and the second groove 52 in the left surface of the holder piece 36 define a second cooperative groove that supports the second protrusion 45.

Figure 4A:
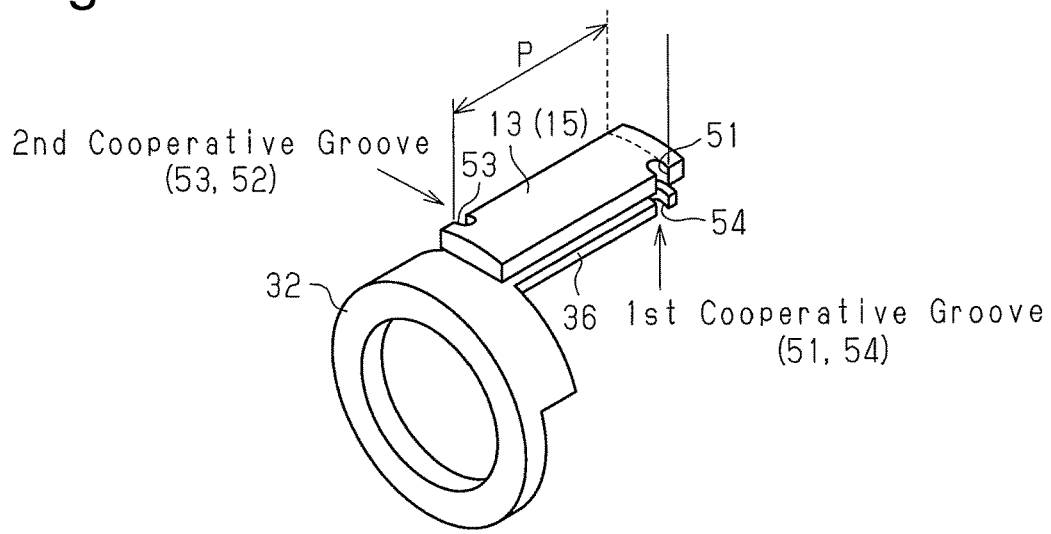
FIG. 4A is a perspective view illustrating grooves of a cylindrical case and a holder.
Figure 4B:
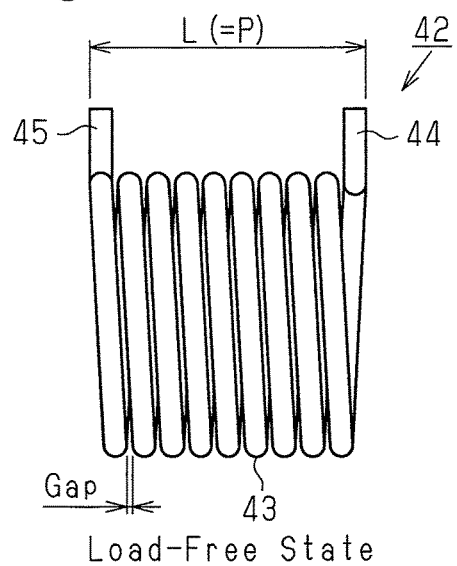
FIG. 4B is a front view of the torsion spring in a load-free state (initial state)

Referring to FIG. 4A, the distance between the first cooperative groove (51 and 54) and the second cooperative groove (53 and 52) in the axial direction defines a fixed length P that sets the pitch of the windings of the coil 43 in a load-free state (initial state). Referring to FIG. 4B, the fixed length P is set to a distance that produces gaps between the windings of the coil 43 when the torsion spring 42 is in the load-free state, with the first and second protrusions 44 and 45 supported by the first and second cooperative grooves. When the first and second protrusions 44 and 45 are supported by the first and second cooperative grooves, the interval L between the first and second protrusions 44 and 45 of the torsion spring 42 in the axial direction is set to the fixed length P between the first and second cooperative grooves. In other words, the interval L between the first and second protrusions 44 and 45 is invariable and equal to the fixed length P between the first and second cooperative grooves. This restricts axial movement of the first and second protrusions 44 and 45 of the torsion spring 42.

The operation of the steering device 1 will now be described. Here, a case will be described in which the steering wheel 20 is operated in the forward direction (counterclockwise direction) to rotate the steering shaft 21 from the reference position.

Figure 2B:
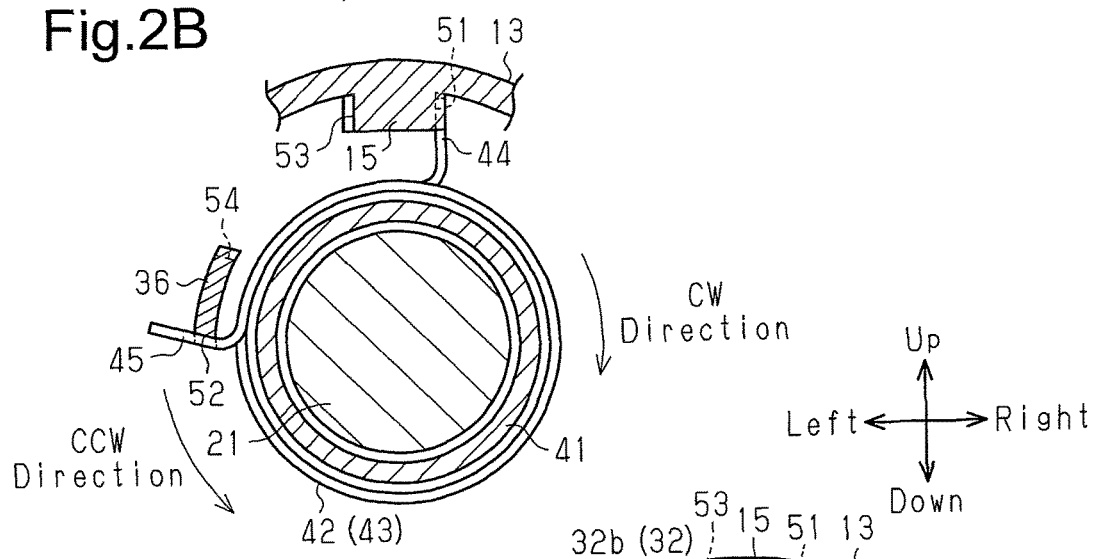
FIG. 2B is a cross-sectional view illustrating the location of the holder piece when the steering shaft is rotated from the reference position in the counterclockwise direction.
Figure 2C:
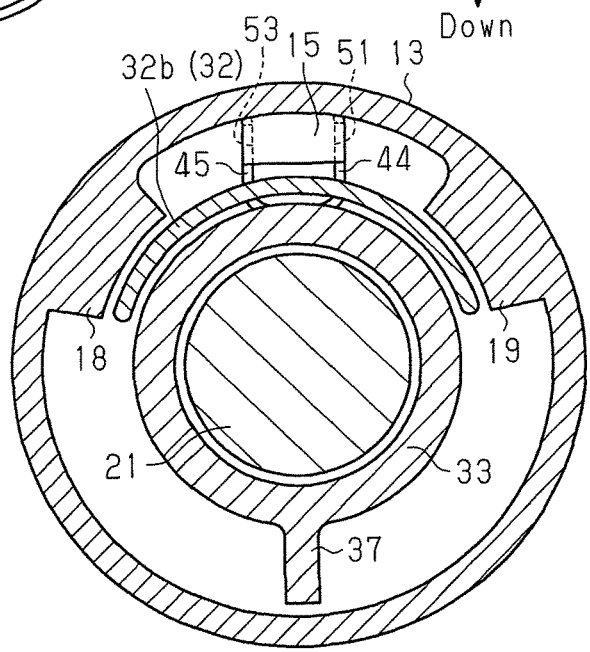
FIG. 2C is a cross-sectional view illustrating the location of a semi-cylindrical step when the steering shaft is located at the reference position.

Referring to FIG. 2B, when the steering shaft 21 is rotated in the counterclockwise direction, the holder 32 is rotated integrally with the steering shaft 21 in the counterclockwise direction. The holder piece 36 is also rotated in the counterclockwise direction. Here, the left surface of the holder piece 36 is in contact with the second protrusion 45. Accordingly, the holder piece 36 pushes and moves the second protrusion 45 in the counterclockwise direction. The torsion spring 42 stores elastic force as the holder piece 36 rotates in the counterclockwise direction. That is, the coil 43 is twisted when the second protrusion 45 of the torsion spring 42 moves in the counterclockwise direction. When the coil 43 is twisted, the twisting force is transmitted to the steering wheel 20 as an operational reactive force. This allows the user to perceive the operation reaction force.

The process in which the operational reactive force is generated will now be described in detail. As illustrated in FIG. 2A, when the steering wheel 20 is not operated, the first protrusion 44 is received in the first cooperative groove, which is defined by the first groove 51 and the fourth groove 54, and the second protrusion 45 is received in the second cooperative groove, which is defined by the third groove 53 and the second groove 52. Here, referring to FIG. 4B, the torsion spring 42 is in a load-free state (initial state), and gaps extend between the windings of the coil 43. The interval L between the first protrusion 44 and the second protrusion 45 is invariable and set by the fixed length P between the first cooperative groove and the second cooperative groove.

Figure 4C:
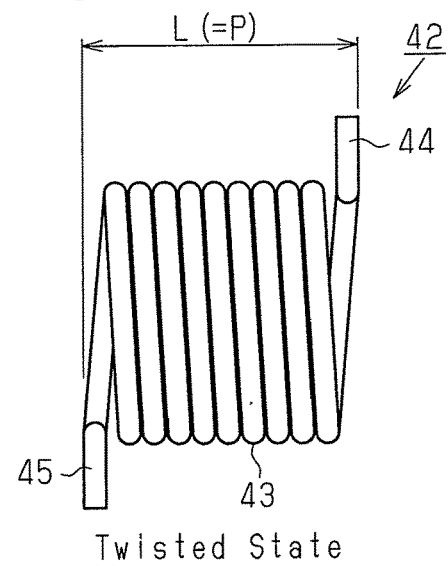
FIG. 4C is a front view of the torsion spring in a twisted state.

From this state, referring to FIG. 2B, when the steering wheel 20 is operated and the steering shaft 21 is rotated in the counterclockwise direction, the spring stopper 15 restricts movement of the first protrusion 44, which remains in the first groove 51. Further, the holder piece 36 pushes the second protrusion 45, which remains in the second groove 52. Here, the first protrusion 44 is separated from the fourth groove 54, and the second protrusion 45 is separated from the third groove 53. However, the first protrusion 44 remains in the first groove 51, and the second protrusion 45 remains in the second groove 52. Thus, the interval L between the first protrusion 44 and the second protrusion 45 is the same as the fixed length P. Accordingly, referring to FIG. 4C, the interval L between the first protrusion 44 and the second protrusion 45 is invariable even when the coil 43 is twisted. As the twisting of the coil 43 increases the number of windings, the gaps between the windings gradually become smaller while the interval L remains the same.

When gaps are eliminated from between adjacent windings, frictional force is generated at the portions where the windings contact one another. In addition to the spring force derived from the elastic force stored in the coil 43, the frictional force is transmitted as operational reaction force to the steering wheel 20. Thus, subsequent to the generation of the frictional force, the operational reaction force increases at a higher rate as the rotational angle (absolute value) of the steering shaft 21 increases (refer to FIG. 5).

The same applies to when the steering shaft 21 is rotated in the reverse direction (clockwise direction). In this case, the spring stopper 15 restricts movement of the second protrusion 45, which remains in the third groove 53. Further, the holder piece 36 pushes the first protrusion 44, which remains in the fourth groove 54. Gaps become smaller between the windings of the coil 43. When the gaps are eliminated and frictional force is generated, the frictional force is added to the operational reaction force. Thus, referring to FIG. 5, subsequent to the generation of the frictional force, the operational reaction force increases at a higher rate as the rotational angle (absolute value) of the steering shaft 21 increases.

The present embodiment has the advantages described below.

(1) When the steering shaft 21 is rotated, the holder 32 and the case 13 twist the coil 43 as the case 13 restricts movement of one of the two protrusions 44 and 45 and the holder 32 pushes the other one of the two protrusions 44 and 45 in the rotation direction. The two protrusions 44 and 45 are supported by both of the holder 32 and the case 13 not only when the steering shaft 21 is in a non-rotated state but also when the steering shaft 21 is rotated. For example, when the steering shaft 21 is rotated in the forward direction (counterclockwise direction), the holder 32 (holder piece 36 in present example) holds the second protrusion 45 in the second groove 52 and pushes the second protrusion 45 in the counterclockwise direction, while the case 13 (spring stopper 15 in present example) holds the first protrusion 44 in the first groove 51 and restricts movement of the first protrusion 44. The interval L between the protrusions 44 and 45 is invariable and set by the fixed length P between the first groove 51 of the case 13 and the second groove 52 of the holder 32. The fixed length P is set to a distance that produces gaps between the windings of the coil 43 when the torsion spring 42 is in a load-free state, with the first and second protrusions 44 and 45 supported by the first and second grooves 51 and 52. In this structure, when the steering shaft 21 is rotated and the coil 43 is twisted, the interval L between the two protrusions 44 and 45 is invariable and the same as the fixed length P. Thus, the gaps between the windings gradually become smaller as the windings increases. When the gaps are eliminated and the windings come into contact with one another, frictional force is generated at the portions where the windings contact one another. As a result, in addition to spring force, the frictional force is transmitted as operational reaction force to the steering wheel 20. This changes (increases) the operational reaction force in the proximity of the rotational terminal end of the steering wheel 20.

(2) When the steering shaft 21 is rotated in the forward direction (counterclockwise direction), the spring stopper 15 restricts movement of the first protrusion 44, which remains in the first groove 51. Further, the holder piece 36 pushes the second protrusion 45, which remains in the second groove 52. When the steering shaft 21 is rotated in the reverse direction (clockwise direction), the spring stopper 15 restricts movement of the second protrusion 45, which remains in the third groove 53. Further, the holder piece 36 pushes the first protrusion 44, which remains in the fourth groove 54. Thus, regardless of whether the steering shaft 21 is rotated in the forward direction or the reverse direction, the interval L between the two protrusions 44 and 45 is invariable and the same as the fixed length P. This allows for application to both of when the steering wheel 20 is operated to rotate the steering shaft 21 in the forward direction and when the steering wheel 20 is operated to rotate the steering shaft in the reverse direction.

It should be apparent to those skilled in the art that the foregoing embodiments may be employed in many other specific forms without departing from the scope of this disclosure. Particularly, it should be understood that the foregoing embodiments may be employed in the following forms.

Referring to FIG. 4B, the gaps between the windings of the coil 43, that is, the pitch of the windings may be changed when the torsion spring 42 is in a load-free state. For example, when the gaps between the windings in a load-free state are set to be larger, the steering shaft 21 needs to be rotated by a larger rotation angle until the windings contact one another and generate frictional force. This increases the rotational angle at which the gradient changes in the graph of FIG. 5. On the contrary, a smaller gap between the windings decreases the rotational angle at which the gradient changes in the graph of FIG. 5.

In addition to the gap between the windings of the coil 43, the fixed length P illustrated in FIG. 4A may be changed.

Figure 5:
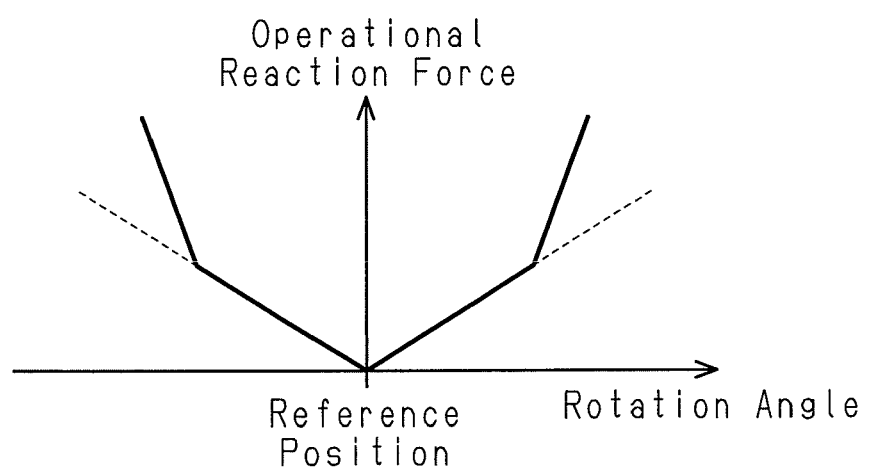
FIG. 5 is a graph illustrating the relationship of the rotation angle and the operational reaction force.

This will also change the changing point of the operational reaction force (position where gradient changes in graph of FIG. 5).

One or more further cooperative grooves may be set in addition to the first and second cooperative grooves. In such a case, selection of the fixed length P or the gap between windings in the initial state (i.e., load-free state) allows for adjustment of the changing point of the operational reaction force.

When the rotation direction of the steering shaft 21 is limited to one direction, for example, the third groove 53 and the fourth groove 54 may be omitted. In this case, the spring stopper 15 restricts movement of the first protrusion 44, which remains in the first groove 51, and the holder piece 36 pushes the second protrusion 45, which remains in the second groove 52. In the same manner, the first groove 51 and the second groove 52 may be omitted, and the third groove 53 and the fourth groove 54 may be used when restricting the rotation direction of the steering shaft 21 to one direction.

The gaps between the windings do not have to be constant. The gaps between the windings may be intentionally changed for design reasons or differ within the range of manufacturing tolerances.

The application of the rotational operation device is not limited to the steering device 1. For example, the rotational operation device may be applied to a rotary switch. The rotary switch includes, for example, a rotational dial (structure corresponding to steering wheel 20) for adjusting the lighting, temperature, or volume. When the dial is rotated, the torsion spring 42 is twisted in accordance with the rotation of a dial rotation shaft (structure corresponding to steering shaft 21), and an operational reaction force (spring force and frictional force) is transmitted to the dial.

The present examples and embodiments are to be considered as illustrative and not restrictive, and the invention is not to be limited to the details given herein, but may be modified within the scope and equivalence of the appended claims.

The invention claimed is:

1. A rotational operation device comprising:
    a rotation shaft rotated when an operation member is rotated;
    a holder fixed to the rotation shaft;
    a torsion coil spring including a coil and two protrusions located at opposite ends of the coil, wherein the rotation shaft is inserted through the coil; and
    a case that accommodates the holder and the torsion coil spring, wherein
    the holder and the case are configured to twist the coil when the rotation shaft is rotated by restricting movement of one of the protrusions with the case and pushing the other one of the protrusions in a rotation direction of the rotation shaft with the holder,
    the case includes a first groove that receives the one of the protrusions,
    the holder includes a second groove that receives the other one of the protrusions,
    the two protrusions are spaced apart in an axial direction of the rotation shaft by an interval that is invariable and set by a fixed length between the first groove of the case and the second groove of the holder, and
    the fixed length is set to a distance that produces a gap between windings of the coil when the torsion coil spring is in a load-free state, with the two protrusions supported by the first and second grooves.

2. The rotational operation device according to claim 1, wherein:
    the two protrusions comprise a first protrusion and a second protrusion;
    the case includes
        the first groove that receives the first protrusion, and
        a third groove that receives the second protrusion;
    the holder includes
        the second groove that receives the second protrusion, and
        a fourth groove that receives the first protrusion;
    the holder and the case are configured so that when the rotation shaft is rotated in a forward direction, the holder holds the second protrusion with the second groove and pushes the second protrusion in the forward direction, while the case holds the first protrusion with the first groove and restricts movement of the first protrusion; and
    the holder and the case are configured so that when the rotation shaft is rotated in a reverse direction, the holder holds the first protrusion with the fourth groove and pushes the first protrusion in the reverse direction, while the case holds the second protrusion with the third groove and restricts movement of the second protrusion.

3. The rotational operation device according to claim 2, wherein:
    the holder and the case are configured so that when the rotation shaft is rotated in the forward direction, the first protrusion is separated from the fourth groove of the holder, and the second protrusion is separated from the third groove of the case; and
    the holder and the case are configured so that when the rotation shaft is rotated in the reverse direction, the second protrusion is separated from the second groove of the holder, and the first protrusion is separated from the first groove of the case.

4. The rotational operation device according to claim 2, wherein
    the first groove of the case and the fourth groove of the holder define a first cooperative groove that supports the first protrusion when the torsion coil spring is in the load-free state, and
    the third groove of the case and the second groove of the holder define a second cooperative group that supports the second protrusion when the torsion coil spring is in the load-free state.

* * * * *